(12) United States Patent
Livne et al.

(10) Patent No.: US 10,951,475 B2
(45) Date of Patent: Mar. 16, 2021

(54) TECHNOLOGIES FOR TRANSMIT SCHEDULER DYNAMIC CONFIGURATIONS

(71) Applicant: Intel Corporation, Santa Clara, CA (US)

(72) Inventors: Sarig Livne, Misgav (IL); Ben-Zion Friedman, Jerusalem (IL); Noam Elati, Zichon Yaakov (IL)

(73) Assignee: Intel Corporation, Santa Clara, CA (US)

(*) Notice: Subject to any disclaimer, the term of this patent is extended or adjusted under 35 U.S.C. 154(b) by 72 days.

(21) Appl. No.: 16/457,100

(22) Filed: Jun. 28, 2019

(65) Prior Publication Data
US 2019/0327132 A1    Oct. 24, 2019

(51) Int. Cl.
| H04L 12/24 | (2006.01) |
| G06F 12/1027 | (2016.01) |
| H04W 72/12 | (2009.01) |
| H04W 88/12 | (2009.01) |

(52) U.S. Cl.
CPC ........ H04L 41/082 (2013.01); G06F 12/1027 (2013.01); H04W 72/1263 (2013.01); H04W 88/12 (2013.01)

(58) Field of Classification Search
CPC .......... G06F 12/1027; H04W 72/1263; H04W 88/12; H04W 72/12; H04L 12/24; H04L 41/0082
See application file for complete search history.

(56) References Cited

U.S. PATENT DOCUMENTS

| 4,805,107 A * | 2/1989 | Kieckhafer | G06F 9/4881 714/15 |
| 6,625,648 B1 * | 9/2003 | Schwaller | H04L 41/0213 370/230 |
| 7,346,757 B2 * | 3/2008 | Hass | G06F 12/1036 711/152 |
| 7,430,643 B2 * | 9/2008 | Jordan | G06F 12/1036 711/150 |
| 7,921,276 B2 * | 4/2011 | Illikkal | G06F 12/126 711/207 |

(Continued)

FOREIGN PATENT DOCUMENTS

WO     2018125558 A1     7/2018

OTHER PUBLICATIONS

Extended European Search Report for Patent Application No. 16/457,100, dated Nov. 2, 2020, 9 pages.

*Primary Examiner* — Sargon N Nano
(74) *Attorney, Agent, or Firm* — Compass IP Law, PC (57) ABSTRACT

Technologies for performing dynamic configurations to a transmit scheduler of a network device with minimal downtime are disclosed. The transmit scheduler includes a topology of scheduling nodes. The transmit scheduler identifies, from a number of configuration operations to be executed on one or more of the scheduling nodes, one or more first configuration operations to be executed while the scheduling nodes are active, one or more second configuration operations to be executed while the scheduling nodes are inactive, and one or more third configuration operations to be executed via a cache. The first operations are executed as part of a background process. The second operations are executed while the scheduling nodes are inactive. The third operations are executed via the cache.

25 Claims, 6 Drawing Sheets

(56) References Cited

U.S. PATENT DOCUMENTS

| | | | |
|---|---|---|---|
| 9,092,360 B2 * | 7/2015 | Hass | G06F 12/1036 |
| 2007/0044106 A2 * | 2/2007 | Kissell | G06F 9/4812 |
| | | | 718/108 |
| 2007/0153737 A1 | 7/2007 | Singh et al. | |
| 2016/0149790 A1 | 5/2016 | Zimmermann et al. | |
| 2019/0354390 A1 * | 11/2019 | Gill | H04L 41/5051 |

* cited by examiner

TECHNOLOGIES FOR TRANSMIT SCHEDULER DYNAMIC CONFIGURATIONS

BACKGROUND

A network device may include a transmit scheduler (also referred to herein as a traffic manager) that implements packet transmission scheduling and queuing flows. The transmit scheduler may control a scheduling node hierarchy that allows service providers to manage quality of service (QoS) requirements on hierarchical levels. The transmit scheduler may be implemented as trees in the hardware, in which the tree provides a number of scheduling nodes and queues.

The transmit scheduler may undergo various configuration changes during runtime. For example, additional scheduling nodes may be provided to the topology or a given group of scheduling nodes may be moved to a different parent tree. Other configuration changes may include changes to bandwidth allocation or changes in a rate limiter for flows. To ensure that QoS requirements are met, the configuration changes should be performed with minimal impact on active scheduling nodes and queues. A current approach to performing configurations involves suspending operation of the transmit scheduler until all configuration changes are complete. However, doing so may result in a relatively long period in which the transmit scheduler is not in operation, as an amount of configuration operations to be performed can be high. Such an approach also results in inefficiency, particularly with scheduling nodes and queues that are not modified by the configuration operations yet also undergo downtime as a result of the configuration operations being performed.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
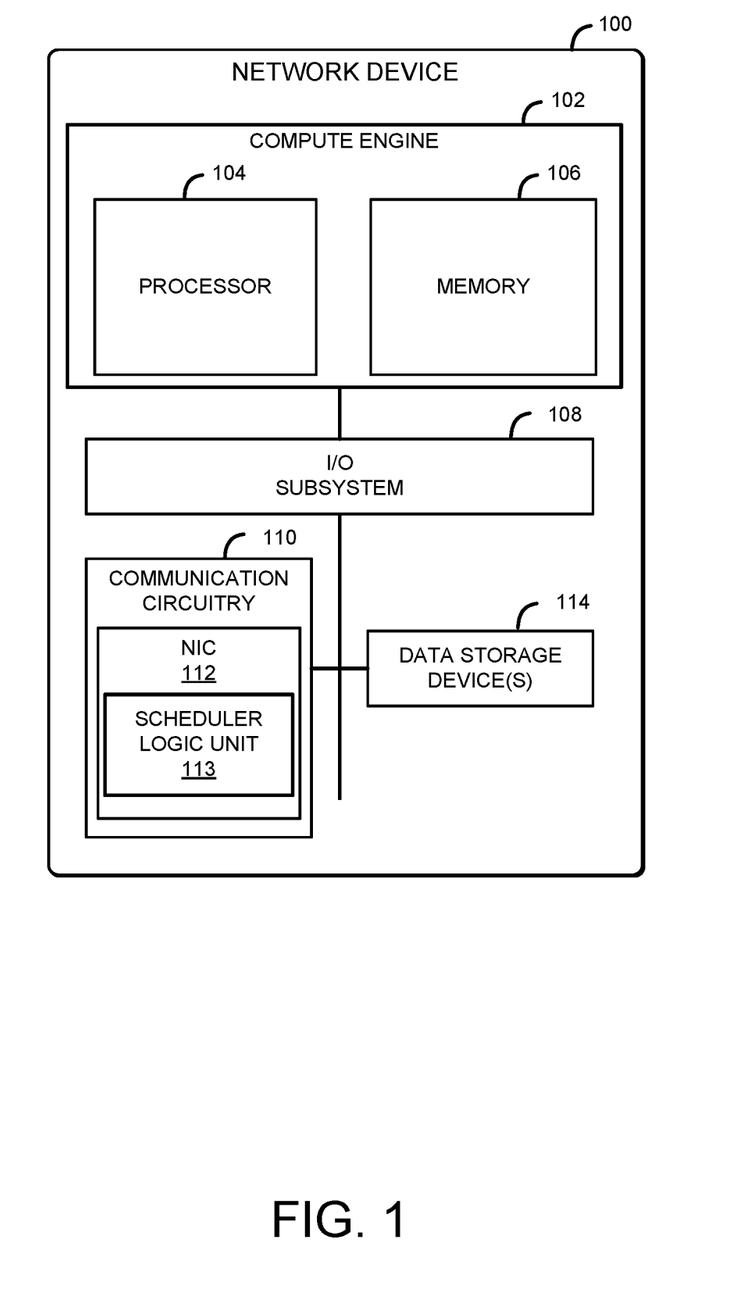
FIG. 1 is a simplified block diagram of at least one embodiment of a network device for transmit scheduler dynamic configurations.

Referring now to FIG. 1, a network device 100 for transmit scheduler dynamic configurations may be embodied as any type of device capable of performing the functions described herein. The network device 100 may be representative of a network switch that forwards traffic (e.g., network packets) from remote computing devices, in which the traffic is sent over a network to other computing devices. The network device 100 may be embodied as a physical device or a virtual network switch that includes a transmit scheduler logic. In other cases, the network device 100 may be embodied as a server in a data center, an application, and the like. The transmit scheduler implements a hierarchical packet transmit scheduling and queuing framework that includes scheduling nodes and queues formed in tree data structures. Throughout the lifecycle of the network device 100, the transmit scheduler may undergo configuration changes, such as in the scheduling node and queue topology or to bandwidth allocation. It is desirable to minimize downtime of the transmit scheduler during such operations to preserve quality of service (QoS) and service level agreement (SLA) requirements.

As further described herein, in an embodiment, the network device 100 carries out a multi-phase configuration approach that includes identifying, from configuration operations to be executed on one or more scheduling nodes, operations to be executed while scheduling nodes are active, operations to be executed while the scheduling nodes are inactive, and operations to be executed via a cache. The network device 100 then executes each of the operations according to a configuration phase scheme which will be further described.

As shown, the illustrative network device 100 includes a compute engine 102, an input/output (I/O) subsystem 108, communication circuitry 110, and one or more data storage devices 114. Of course, in other embodiments, the network device 100 may include other or additional components, such as those commonly found in a computer (e.g., display, keyboard, mouse, etc). Additionally, in some embodiments, one or more of the illustrative components may be incorporated in, or otherwise form a portion of, another component.

The compute engine 102 may be embodied as any type of device or collection of devices capable of performing various compute functions described below. In some embodiments, the compute engine 102 may be embodied as a single device such as an integrated circuit, an embedded system, a field programmable gate array (FPGA), a system-on-a-chip (SOC), or other integrated system or device. Additionally, in some embodiments, the compute engine 102 includes or is embodied as a processor 104 and a memory 106. The processor 104 may be embodied as one or more processors, each processor being a type capable of performing the functions described herein. For example, the processor 104 may be embodied as a single or multi-core processor(s), a microcontroller, or other processor or processing/controlling circuit. In some embodiments, the processor 104 may be embodied as, include, or be coupled to an FPGA, an ASIC, reconfigurable hardware or hardware circuitry, or other specialized hardware to facilitate performance of the functions described herein.

The memory 106 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 106 may be integrated into the processor 104.

The compute engine 102 is communicatively coupled with other components of a network (e.g., a data center, a cloud service provider network, etc.) via the I/O subsystem 108, which may be embodied as circuitry and/or components to facilitate input/output operations with the compute engine 102 (e.g., with the processor 104 and/or the memory 106) and other components of the network device 100. For example, the I/O subsystem 108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 108 may form a portion of a system-on-a-chip (SoC) and be incorporated, along with one or more of the processor 104, the memory 106, and other components of the network device 100, into the compute engine 102.

The communication circuitry 110 may be embodied as any communication circuit, device, or collection thereof, capable of enabling communications over a network between the network device 100 and other devices, such as the compute devices sending data via the network device 100. The communication circuitry 110 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 110 includes a network interface controller (NIC) 112, which may also be referred to as a host fabric interface (HFI). The NIC 112 includes an Ethernet port logic to connect to remote devices (e.g., other network devices, devices connected to the network, and the like). The NIC 112 may be embodied as one or more add-in-boards, daughtercards, controller chips, chipsets, or other devices that may be used by the computing device 200 for network communications with remote devices. For example, the NIC 112 may be embodied as an expansion card coupled to the I/O subsystem 108 over an expansion bus such as PCI Express.

Illustratively, the NIC 112 includes a scheduler logic unit 113. The scheduler logic unit 113 may be embodied as any circuitry, hardware, or devices to perform the functions of the transmit scheduler (also referred to herein as a traffic manager), including identifying configuration operations to be performed on the transmit scheduler, distinguishing between which of the configuration operations are to be performed while the transmit scheduler is active and inactive, and managing buffers and cache tables from which various configuration operations may be executed. The scheduler logic unit 213 may be programmed into the hardware of the NIC 112. However, the scheduler logic unit 213 may also be included with the network device 100 separate from the NIC 112.

The one or more illustrative data storage devices 114 may be embodied as any type of devices configured for short-term or long-term storage of data such as, for example, memory devices and circuits, memory cards, hard disk drives (HDDs), solid-state drives (SSDs), or other data storage devices. Each data storage device 114 may include a system partition that stores data and firmware code for the data storage device 114. Each data storage device 114 may also include an operating system partition that stores data files and executables for an operating system.

As described above, the network device 100 is illustratively in communication via a network, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Note, the following references a transmit scheduler as an example of performing atomic configuration operations on a relatively large number of variables. Of course, one of skill in the art will recognize that embodiments disclosed herein may apply to any device or software that performs coherent atomic configuration operations on a number of variables. For instance, the embodiments disclosed herein may apply to other components of the network device 100 or to other types of schedulers (e.g., a memory scheduler).

Figure 2:
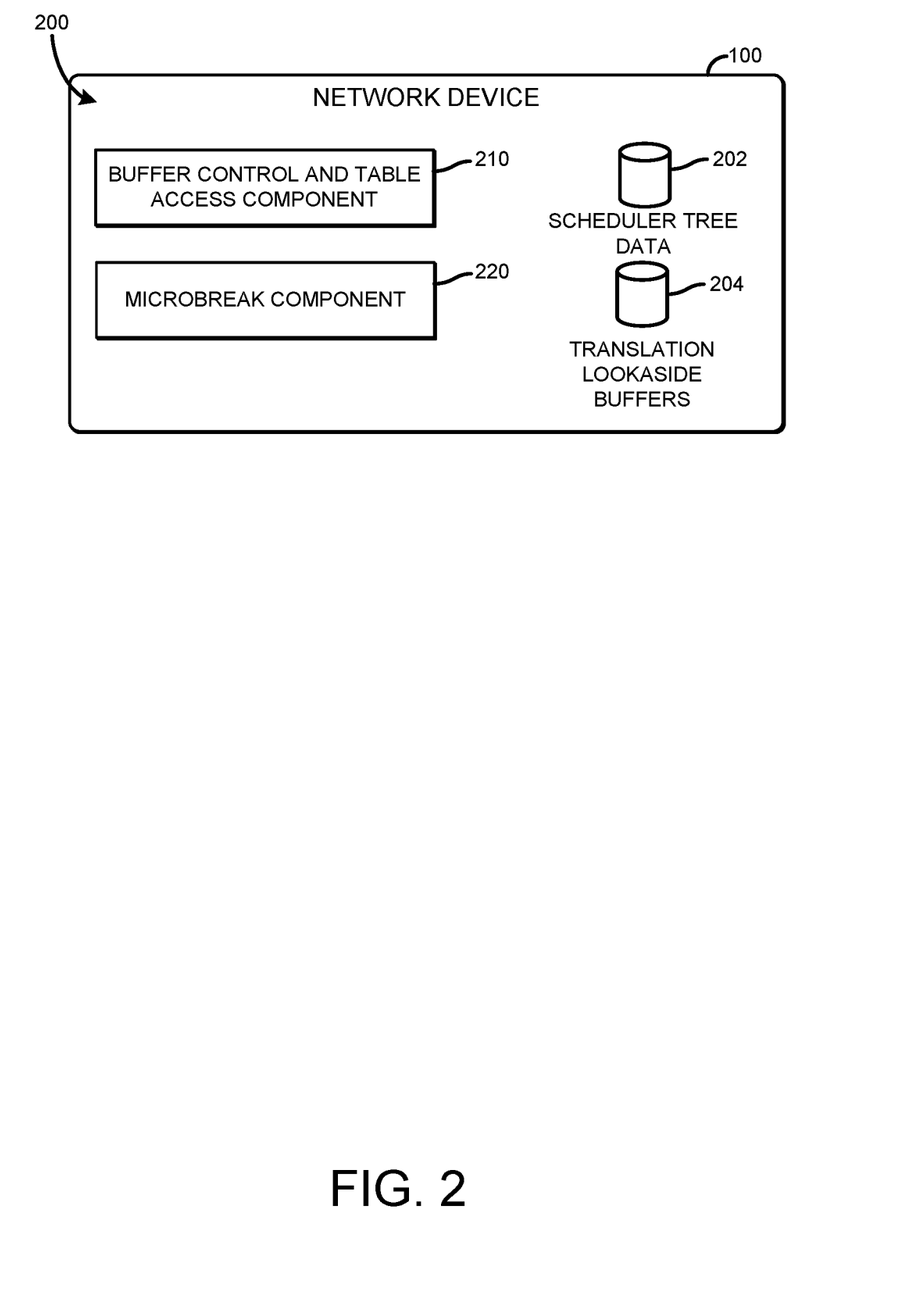
FIG. 2 is a simplified block diagram of at least one embodiment of an environment that may be executed on the network device of FIG. 1.

Referring now to FIG. 2, the network device 100 may establish an environment 200 during operation. The illustrative environment 300 includes a buffer control and table access component 210 and a microbreak component 220. Each of the components of the environment 200 may be embodied as hardware, firmware, software, or a combination thereof. As such, in some embodiments, one or more components of the environment 200 may be embodied as circuitry or a collection of electrical devices (e.g., buffer control and table access component circuitry 210, microbreak component circuitry 220, etc.). It should be appreciated that, in such embodiments, one or more of the buffer control and table access component circuitry 210 or microbreak component circuitry 220 may form a portion of one or more of the NIC 112, compute engine 102, the communication circuitry 110, the I/O subsystem 108 and/or other components of the network device 100. In the illustrative embodiment, the environment 200 includes scheduler tree data 202, which may be embodied as any memory, tables, registers, or other programmable storage of the NIC 112. The scheduler tree data 202 may include multiple scheduling nodes that are organized into hierarchical layers. The nodes of the scheduler tree data 202 may be organized upward from a root corresponding to the network port of the NIC 112 up to leaf nodes that correspond to individual queues. As the tree is traversed from the leaf to the root, the number of nodes reduces (e.g., by a factor of 4 or 2). The environment 200 also includes one or more translation lookaside buffers (TLB) 204, which may be embodied as any memory, tables, registers, or other programmable storage of the NIC 112 used to store topology table data for the transmit scheduler and provide updated values when triggered by software.

The illustrative buffer control and table access component 210 is configured to load command buffers (e.g., first-in-first-out (FIFO)-based buffers) with scheduler configuration operations prior to execution thereof. The buffer control and table access component 210 may trigger the loaded buffers to execute each operation independently until completion of that operation. Further, the buffer control and table access component 210 may trigger an indication of the completion of the operation (e.g., to a software application or firmware associated with the configuration operation). For instance, the buffer control and table access component 210 may do so via polling or interrupts. In addition, the buffer control and table access component 210 is also to load configuration operations into the TLBs 204, which may be triggered to execute each operation and update topology table values.

The illustrative microbreak component 220 is configured to, via one or more hardware mechanisms in the NIC 112, execute a microbreak flow (described herein) in which configuration operations (e.g., move operations of scheduling nodes) are executed. As previously stated, the transmit scheduler may identify configuration operations that can be performed in the background while the transmit scheduler is active (e.g., while one or more scheduling nodes of the transmit scheduler is active) and configuration operations to be performed while operation of the transmit scheduler is suspended. The microbreak process enables fast execution of the configuration operations being performed while the transmit scheduler is momentarily suspended.

Figure 3:
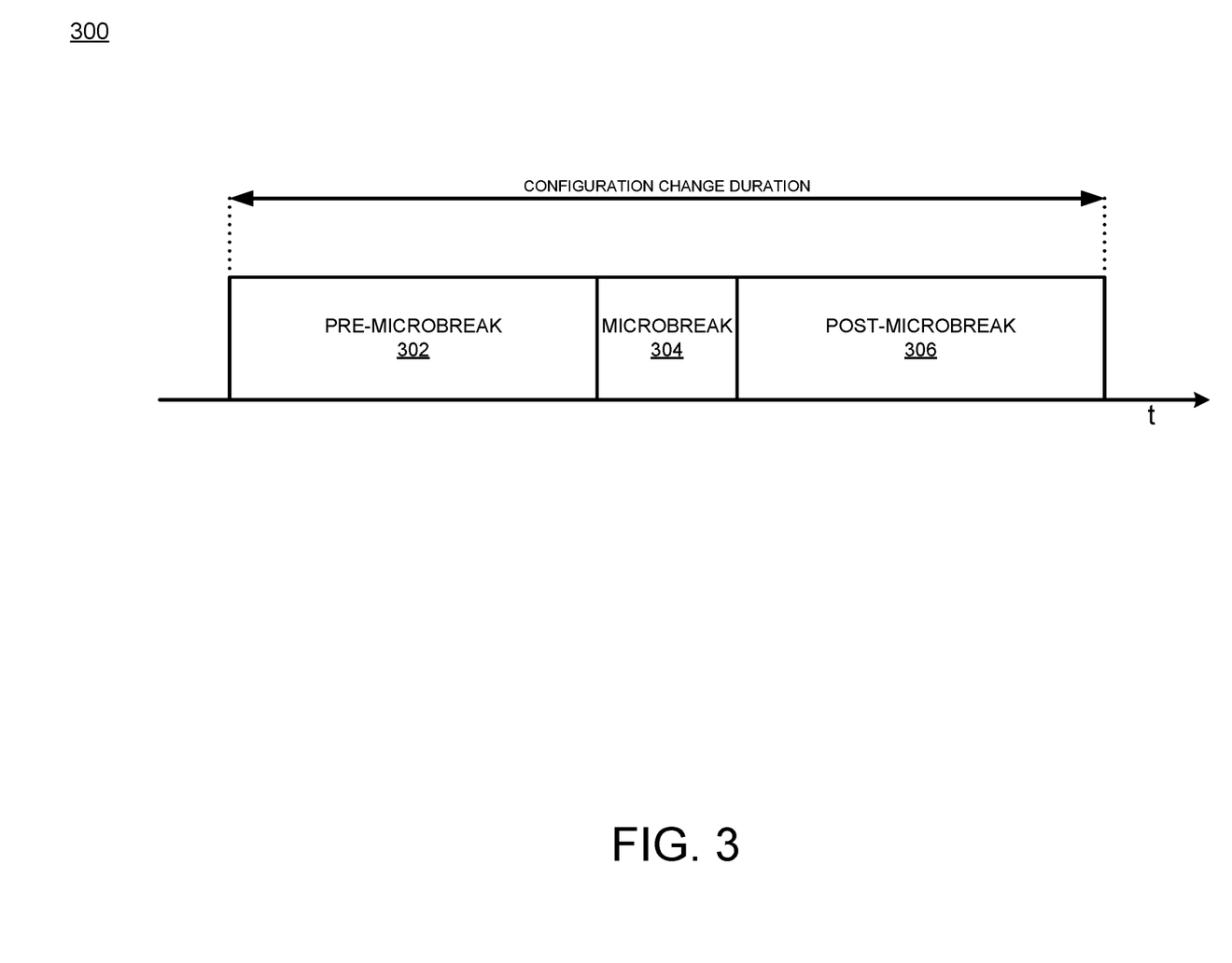
FIG. 3 is a simplified conceptual diagram of at least one embodiment of phases for carrying out transmit scheduler configuration changes on the network device of FIG. 1.

More particularly, referring now to FIG. 3, a conceptual diagram of an example 300 of phases for carrying out transmit scheduler configuration operations is shown. The example 300 depicts a pre-microbreak phase 302, a microbreak phase 304, and a post-microbreak phase 306 laid out on an x-axis representative of time. The phases occur during a given configuration change duration, as indicated by the two-way arrow. In this example 300, assume that the transmit scheduler is to undergo a number of configuration operations.

During the pre-microbreak phase 302, the transmit scheduler executes configuration operations that can be performed on active and inactive scheduling nodes and queues. During phase 302, the configuration operations may compete with other transmit operations in the scheduling pipeline, and as a result may be completed at a relatively long rate. Examples of such configuration operations include changes to rate limiter parameters and bandwidth allocations on one or more of the scheduling nodes. Such configuration operations do not affect performance of scheduling nodes that are not targeted by the operations.

During the microbreak phase 304, the transmit scheduler (e.g., via the microbreak component 220) may determine that the scheduling pipeline is not currently executing any pending operations and suspend scheduling operations. The transmit scheduler may then execute configuration operations that are to be performed while the scheduling operations are momentarily suspended. Such operations may include changes to topology in scheduling nodes that cannot otherwise be performed while the scheduling nodes are active, such as changing a parent of a given scheduling node (or group of scheduling nodes). For instance, to do so, the transmit scheduler (e.g., via the buffer control and table access component 210) may load FIFO buffers with the update commands (e.g., enter and exit commands) and configuration operations as a batch process and trigger the buffers to execute each operation by the hardware (e.g., as opposed to software in the network device 100) individually during the microbreak phase 304. Advantageously, because the configuration operations performed during the microbreak phase 304 do not compete with scheduling operations, the transmit scheduler can execute the configuration operations relatively quickly. As a result, the scheduling node downtime and flow interruption are minimized. The example 300 depicts the microbreak phase 304 as relatively short compared to the pre-microbreak phase 302 and the post-microbreak phase 306. Generally, the execution rate of operations performed during the microbreak phase 304 is significantly higher than configuration operations in either the pre-microbreak phase 302 or the post-microbreak phase 306 (e.g., approximately six times higher in some cases).

In addition, the transmit scheduler (e.g., via the buffer control and table access component 210) also loads TLBs 204 with configuration operations associated with modifying table values associated with the scheduling node topology for scheduling nodes and queues that have not yet been updated. Note, although TLBs 204 are discussed relative to such configuration operations, other hardware caches may be used. The transmit scheduler (e.g., via the microbreak component 220) may then resume operation of the scheduling pipeline. During the post-microbreak phase 306, the transmit scheduler triggers execution of the configuration operations stored in the TLBs 204 in the background while traffic flows on scheduler tree branches. Such operations may be performed during operation of the scheduler node and thus do not affect performance of active scheduling nodes and queues that are not targeted by the operations.

Figure 4:
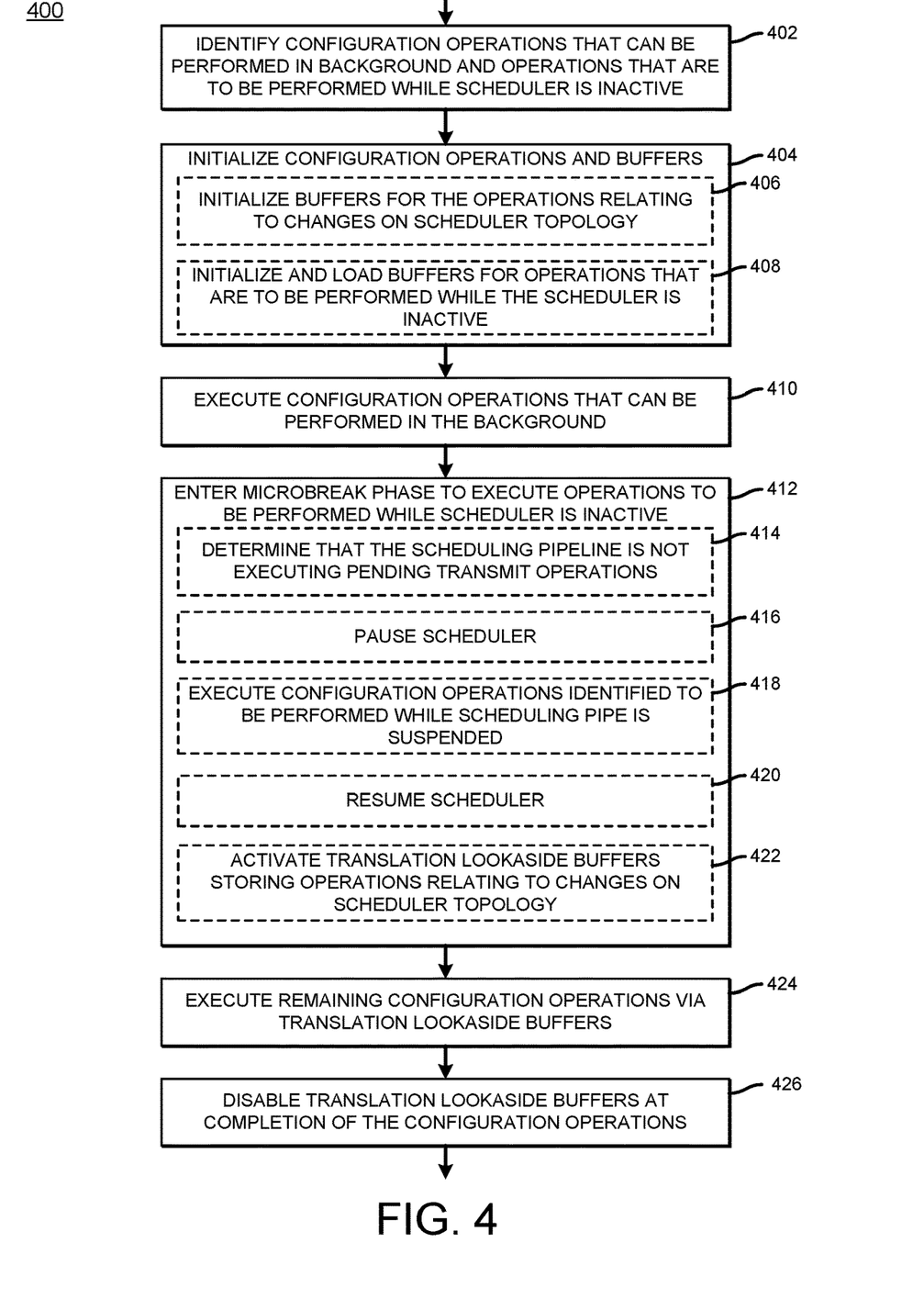
FIG. 4 is a simplified flow diagram of at least one embodiment of a method for performing transmit scheduler configuration changes on the network device of FIG. 1.

Referring now to FIG. 4, the network device 100, in operation, performs a method 400 for carrying out configuration change operations on a transmit scheduler. The method 400 may be performed, for example, by the transmit scheduler. For this example, assume that the network device 100 has received a number of configuration changes (e.g., by a user, by an application, by firmware, etc.) to be performed on one or more scheduling nodes and queues of the transmit scheduler. As shown, the method 400 begins in block 402, in which the network device 100 identifies configuration operations to be performed to carry out the configuration changes. More particularly, the network device 100 identifies configuration operations that can be performed in the background on active scheduling nodes and operations that are to be performed while the transmit scheduler (e.g., the scheduling nodes and queues) are inactive.

In block 404, the network device 100 initializes the configuration operations and any buffers that are used to store configuration operations to be performed. For instance, in block 404, the network device 100 initializes buffers for the operations to store configuration operations relating to updates on scheduler topology such as the TLBs 204. The network device 100 may load configuration operations into the TLBs 204 to be executed following the microbreak phase. In block 408, the network device 100 initializes and loads buffers for operations that are to be performed while the scheduler is inactive.

In block 410, the network device 100 executes configuration operations that can be performed in the background, e.g., configuration operations that can be performed while scheduling nodes unaffected by the configuration operations are active (e.g., rate limiter changes, bandwidth allocation changes, etc.). Such configuration operations may compete with other scheduling operations.

In block 412, the network device 100 enters into a microbreak phase in which configuration operations are executed while the transmit scheduler (e.g., the scheduling nodes and queues) are inactive. More particularly, the configuration operations executed during the microbreak phase are those configuration operations identified as not being able to be performed while scheduling nodes and queues are active. During the microbreak phase, in block 414, the network device 100 may determine that the scheduling pipeline is not currently executing transmit operations (e.g., pending transmit operations), and thus the scheduling nodes and queues are inactive. In block 416, the network device 100 pauses the transmit scheduler. In block 418, the network device 100 executes the configuration operations identified to be performed while the scheduling pipe is suspended. In block 420, the network device 100 resumes the transmit scheduler. Further, in block 422, the network device 100 activates the TLBs storing the remaining configuration operations.

In block 424, the network device 100 executes the remaining configuration operations via the loaded TLBs. More particularly, the network device 100 triggers execution of the configuration operations to be performed in the background (e.g., while the scheduling nodes and queues are active). Once the configuration operations are executed, in block 426, the network device 100 may disable the TLBs.

Note, in some cases, the network device 100 may activate TLB s to execute a relatively small amount of configuration operations to the transmit scheduler (e.g., rather than momentarily suspending scheduling node activities and reconfiguring every parameter of the transmit scheduler prior to resuming).

Figure 5:
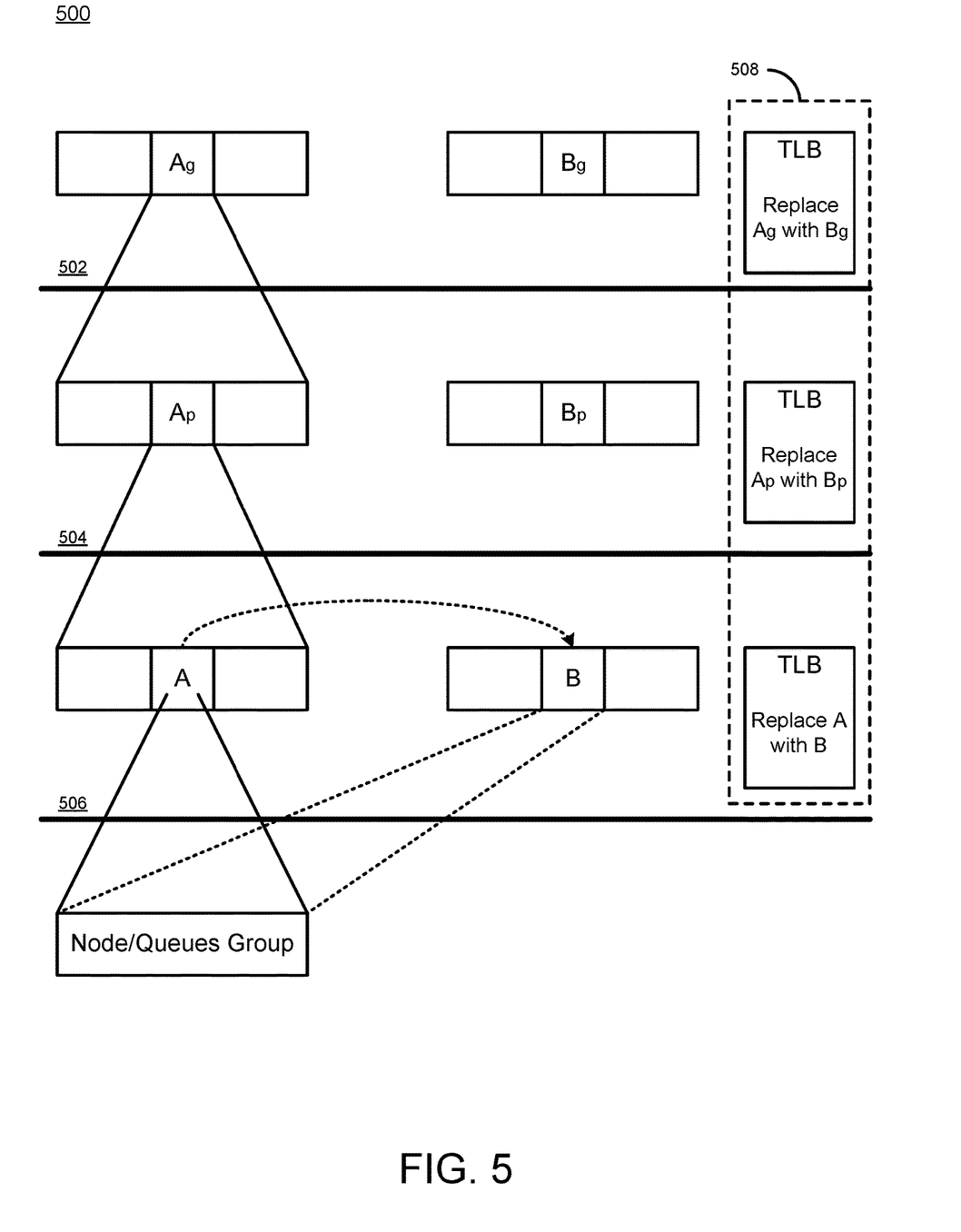
FIG. 5 is a simplified conceptual diagram of an example of moving a scheduling node to a new parent node on the transmit scheduler of the network device of FIG. 1.

Referring now to FIG. 5, an example 500 of a configuration operation being performed on scheduling nodes and queues is shown. Example 500 depicts a scheduler subtree hierarchy in which the top level represents a grandparent (g) layer 502, the level following represents a parent (p) layer 504, and the level following represents the node layer 506. In particular, the example 500 is representative of a move operation in which a node and queues group that is associated with a parent A is to be associated with a parent B. For scheduling tree implementations that require large scale scheduling entities combined with many scheduling layers and high performance, these implementations typically maintain a configuration of a parent chain (e.g., node, parent, grandparent, great-grandparent, etc.), which is also referred to a branch table. A given branch table may be implemented in one or more layers.

The move operation generally requires access on all nodes of the branch table hierarchy. In this example 500, the move operation requires an update to A, $A_p$, and $A_g$ to B, $B_p$, and $B_g$. In the event that the subtree includes many nodes, the configuration changes might require numerous access operations. However, such operations may be loaded into TLBs to be executed in the background. The TLBs are activated during the microbreak process and provide updated values for nodes and queues that have not yet been updated, e.g., the transmit scheduler still references the nodes at A following the microbreak phase. Illustratively, FIG. 5 depicts TLBs 508 associated with each of the node, parent, and grandparent layers. Each TLB includes configuration operations indicative of the action to be performed at that layer. For instance, at the grandparent layer, the TLB is loaded with $A_g$ to $B_g$. Note, when all branch table layer nodes are updated, the TLB does not generate a cache hit. In such an event, the transmit scheduler may disable the respective TLB and reuse the same for a given flow.

Figure 6:
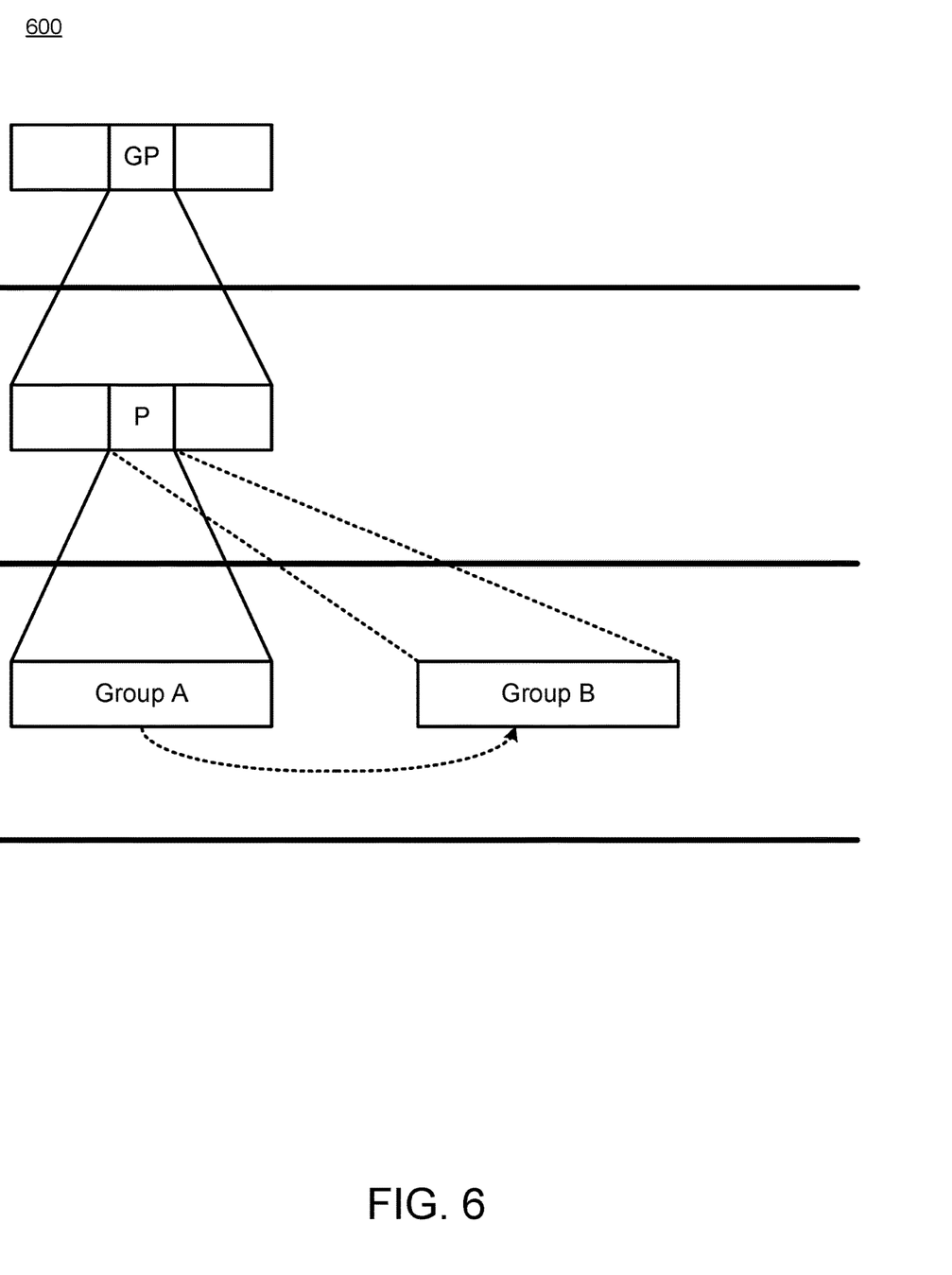
FIG. 6 is a simplified conceptual diagram of an example of copying a group of scheduling nodes associated with a parent node on the transmit scheduler of the network device of FIG. 1.

Referring now to FIG. 6, an example 600 of a configuration operation being performed on scheduling nodes and queues is shown. Example 500 depicts a scheduler subtree hierarchy in which the top level represents a grandparent (g) layer 602, the level following represents a parent (p) layer 604, and the level following represents the node layer 606. In particular, the example 600 is representative of a copy operation in which a node and queues group that is associated with a parent A is to be move to a new location. For instance, such operations may occur to free additional space for expansion for the node group but has no capacity for additional members at the current location. In such a case, the parent is presented, but the configuration operation includes copying the node data (e.g., configuration and state data associated with each of the nodes in the group) to a new location with minimal operation. In such a case, these operations are performed during the microbreak phase described herein. For instance, the operations involved with moving the node groups may be performed while the scheduling pipeline is paused and the scheduler nodes and queues are inactive.

EXAMPLES

Illustrative examples of the technologies disclosed herein are provided below. An embodiment of the technologies may include any one or more, and any combination of, the examples described below.

Example 1 includes a network device comprising a network controller comprising a transmit scheduler including a topology of scheduling nodes, wherein the transmit scheduler is to identify, from a plurality of configuration operations to be executed on one or more of the scheduling nodes, (i) one or more first configuration operations to be executed while the scheduling nodes are active, (ii) one or more second configuration operations to be executed while the scheduling nodes are inactive, and (iii) one or more third configuration operations to be executed via a buffer; execute the one or more first operations as part of a background process for the transmit scheduler; execute the one or more second operations while the scheduling nodes are inactive; and execute the one or more third operations via the buffer.

Example 2 includes the subject matter of Example 1, and wherein to execute the one or more second operations while the scheduling nodes are inactive comprises to determine that a scheduling pipeline is not currently executing pending transmission operations.

Example 3 includes the subject matter of any of Examples 1 and 2, and wherein to execute the one or more second operations while the scheduling nodes are inactive further comprises to suspend operation of the transmit scheduler; execute the one or more second operations; and resume the transmit scheduler.

Example 4 includes the subject matter of any of Examples 1-3, and wherein to execute the one or more second operations while the scheduling nodes are inactive further comprises to load the one or more third operations in the buffer; and activate the buffer.

Example 5 includes the subject matter of any of Examples 1-4, and wherein to execute the one or more third operations comprises to execute the one or more third operations via a translation lookaside buffer (TLB).

Example 6 includes the subject matter of any of Examples 1-5, and wherein to identify the one or more first configuration operations comprises to identify one or more of a rate limiter change operation and bandwidth allocation change operation to be executed.

Example 7 includes the subject matter of any of Examples 1-6, and wherein the transmit scheduler is further to load the one or more second configuration operations into a first-in-first-out (FIFO) buffer for execution.

Example 8 includes the subject matter of any of Examples 1-7, and wherein to identify the one or more second configuration operations comprises to identify one or more operations to move one or more of the scheduling nodes that are active.

Example 9 includes the subject matter of any of Examples 1-8, and wherein to identify the one or more third configuration operations comprises to identify one or more update operations on a table associated with the topology of the scheduling nodes.

Example 10 includes the subject matter of any of Examples 1-9, and wherein the transmit scheduler is further to initialize a FIFO buffer to store the one or more second operations.

Example 11 includes one or more machine-readable storage media comprising a plurality of instructions, which, when executed, causes a network device to identify, from a plurality of configuration operations to be executed on one or more scheduling nodes of a transmit scheduler of the network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology; execute the one or more first operations as part of a background process for the transmit scheduler; execute the one or more second operations while the scheduling nodes are inactive; and execute the one or more third operations via the buffer.

Example 12 includes the subject matter of Example 11, and wherein to execute the one or more second operations while the scheduling nodes are inactive comprises to determine that a scheduling pipeline is not currently executing pending transmission operations.

Example 13 includes the subject matter of any of Examples 11 and 12, and wherein to execute the one or more second operations while the scheduling nodes are inactive further comprises to suspend operation of the transmit scheduler; execute the one or more second operations; and resume the transmit scheduler.

Example 14 includes the subject matter of any of Examples 11-13, and wherein to execute the one or more second operations while the scheduling nodes are inactive further comprises to load the one or more third operations in the buffer; activate the buffer.

Example 15 includes the subject matter of any of Examples 11-14, and wherein to execute the one or more third operations comprises to execute the one or more third operations via a translation lookaside buffer (TLB).

Example 16 includes the subject matter of any of Examples 11-15, and wherein to identify the one or more first configuration operations comprises to identify one or more of a rate limiter change operation and bandwidth allocation change operation to be executed.

Example 17 includes the subject matter of any of Examples 11-16, and wherein the transmit scheduler is further to load the one or more second configuration operations into a first-in-first-out (FIFO) buffer for execution.

Example 18 includes the subject matter of any of Examples 11-17, and wherein to identify the one or more second configuration operations comprises to identify one or more operations to move one or more of the scheduling nodes that are active.

Example 19 includes the subject matter of any of Examples 11-18, and wherein to identify the one or more third configuration operations comprises to identify one or more update operations on a table associated with the topology of the scheduling nodes.

Example 20 includes the subject matter of any of Examples 11-19, and wherein the transmit scheduler is further to initialize a FIFO buffer to store the one or more second operations.

Example 21 includes a network device comprising means for identifying, from a plurality of configuration operations to be executed on one or more scheduling nodes of a transmit scheduler of the network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology; means for executing the one or more first operations as part of a background process for the transmit scheduler; means for executing the one or more second operations while the scheduling nodes are inactive; and means for executing the one or more third operations via the buffer.

Example 22 includes the subject matter of Example 21, and wherein the means for executing the one or more second operations while the scheduling nodes are inactive comprises circuitry for determining that a scheduling pipeline is not currently executing pending transmission operations.

Example 23 includes the subject matter of any of Examples 21 and 22, and wherein the means for executing the one or more second operations while the scheduling nodes are inactive further comprises circuitry for suspending operation of the transmit scheduler; circuitry for executing the one or more second operations; and circuitry for resuming the transmit scheduler.

Example 24 includes the subject matter of any of Examples 21-23, and wherein the means for executing the one or more second operations while the scheduling nodes are inactive further comprises circuitry for loading the one or more third operations in the buffer; and circuitry for activating the buffer.

Example 25 includes a method comprising identifying, from a plurality of configuration operations to be executed on one or more scheduling nodes of a transmit scheduler of the network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology; executing the one or more first operations as part of a background process for the transmit scheduler; executing the one or more second operations while the scheduling nodes are inactive; and executing the one or more third operations via the buffer.

The invention claimed is:

1. A network device comprising:
a network controller comprising a transmit scheduler including a topology of scheduling nodes, wherein the transmit scheduler is to:
identify, from a plurality of configuration operations to be executed on one or more of the scheduling nodes, (i) one or more first configuration operations to be executed while the scheduling nodes are active, (ii) one or more second configuration operations to be executed while the scheduling nodes are inactive, and (iii) one or more third configuration operations to be executed via a buffer;
execute the one or more first configuration operations as part of a background process for the transmit scheduler;
execute the one or more second configuration operations while the scheduling nodes are inactive; and
execute the one or more third configuration operations via the buffer.

2. The network device of claim 1, wherein to execute the one or more second configuration operations while the scheduling nodes are inactive comprises to determine that a scheduling pipeline is not executing pending transmission configuration operations.

3. The network device of claim 2, wherein to execute the one or more second configuration operations while the scheduling nodes are inactive further comprises to:
suspend operation of the transmit scheduler;
execute the one or more second configuration operations; and
resume the transmit scheduler.

4. The network device of claim 3, wherein to execute the one or more second configuration operations while the scheduling nodes are inactive further comprises to:
load the one or more third configuration operations in the buffer; and
activate the buffer.

5. The network device of claim 1, wherein to execute the one or more third configuration operations comprises to execute the one or more third configuration operations via a translation lookaside buffer (TLB).

6. The network device of claim 1, wherein to identify the one or more first configuration operations comprises to identify one or more of a rate limiter change operation and bandwidth allocation change operation to be executed.

7. The network device of claim 1, wherein the transmit scheduler is further to load the one or more second configuration operations into a first-in-first-out (FIFO) buffer for execution.

8. The network device of claim 1, wherein to identify the one or more second configuration operations comprises to identify one or more operations to move one or more of the scheduling nodes that are active.

9. The network device of claim 1, wherein to identify the one or more third configuration operations comprises to identify one or more update operations on a table associated with the topology of scheduling nodes.

10. The network device of claim 1, wherein the transmit scheduler is further to:
initialize a FIFO buffer to store the one or more second configuration operations.

11. One or more machine-readable storage media comprising a plurality of instructions, which, when executed, causes a network device to:
identify, from a plurality of configuration operations to be executed on one or more scheduling nodes of a transmit scheduler of the network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology;

execute the one or more first configuration operations as part of a background process for the transmit scheduler;

execute the one or more second configuration operations while the scheduling nodes are inactive; and execute the one or more third configuration operations via the buffer.

12. The network device of claim 11, wherein to execute the one or more second configuration operations while the scheduling nodes are inactive comprises to determine that a scheduling pipeline is not executing pending transmission operations.

13. The network device of claim 12, wherein to execute the one or more second configuration operations while the scheduling nodes are inactive further comprises to:
suspend operation of the transmit scheduler;
execute the one or more second configuration operations; and
resume the transmit scheduler.

14. The network device of claim 13, wherein to execute the one or more second configuration operations while the scheduling nodes are inactive further comprises to:
load the one or more third configuration operations in the buffer; and
activate the buffer.

15. The network device of claim 11, wherein to execute the one or more third configuration operations comprises to execute the one or more third configuration operations via a translation lookaside buffer (TLB).

16. The network device of claim 11, wherein to identify the one or more first configuration operations comprises to identify one or more of a rate limiter change operation and bandwidth allocation change operation to be executed.

17. The network device of claim 11, wherein the transmit scheduler is further to load the one or more second configuration operations into a first-in-first-out (FIFO) buffer for execution.

18. The network device of claim 11, wherein to identify the one or more second configuration operations comprises to identify one or more operations to move one or more of the scheduling nodes that are active.

19. The network device of claim 11, wherein to identify the one or more third configuration operations comprises to identify one or more update operations on a table associated with the topology of the scheduling nodes.

20. The network device of claim 11, wherein the transmit scheduler is further to:
initialize a FIFO buffer to store the one or more second configuration operations.

21. A network device comprising:
means for identifying, from a plurality of configuration operations to be executed on one or more scheduling nodes of a transmit scheduler of the network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology;
means for executing the one or more first configuration operations as part of a background process for the transmit scheduler;
means for executing the one or more second configuration operations while the scheduling nodes are inactive; and
means for executing the one or more third configuration operations via the buffer.

22. The network device of claim 21, wherein the means for executing the one or more second configuration operations while the scheduling nodes are inactive comprises circuitry for determining that a scheduling pipeline is not executing pending transmission operations.

23. The network device of claim 22, wherein the means for executing the one or more second configuration operations while the scheduling nodes are inactive further comprises:
circuitry for suspending operation of the transmit scheduler;
circuitry for executing the one or more second configuration operations; and
circuitry for resuming the transmit scheduler.

24. The network device of claim 23, wherein the means for executing the one or more second configuration operations while the scheduling nodes are inactive further comprises:
circuitry for loading the one or more third configuration operations in the buffer; and
circuitry for activating the buffer.

25. A method comprising:
identifying, from a plurality of configuration operations to be executed on one or more scheduling nodes of a transmit scheduler of a network device, (i) one or more first configuration operations to be executed while the scheduling nodes are active, (ii) one or more second configuration operations to be executed while the scheduling nodes are inactive, and (iii) one or more third configuration operations to be executed via a buffer, wherein the scheduling nodes are organized in a topology;
executing the one or more first configuration operations as part of a background process for the transmit scheduler;
executing the one or more second configuration operations while the scheduling nodes are inactive; and
executing the one or more third configuration operations via the buffer.

* * * * *